United States Patent [19]

Vink

[11] 3,932,091

[45] Jan. 13, 1976

[54] PELLET MILL WITH SEPARATE FEE MEANS FOR EACH DIE ROLLER

[76] Inventor: Johannes Albertus Vink, Bisschopswater 17, Breukelen, Netherlands

[22] Filed: Jan. 28, 1975

[21] Appl. No.: 544,699

[52] U.S. Cl. .................. 425/331; 425/DIG. 230
[51] Int. Cl.² .................. A23N 17/00; B29F 3/012
[58] Field of Search ........... 425/331, DIG. 230, 314

[56] References Cited
UNITED STATES PATENTS

| | | | |
|---|---|---|---|
| 2,870,481 | 1/1959 | Bonnafoux | 425/331 |
| 3,045,280 | 7/1962 | Bonnafoux | 425/331 X |
| 3,139,844 | 7/1964 | Landers | 425/DIG. 230 |
| 3,825,387 | 7/1974 | Gilman | 425/331 X |

*Primary Examiner*—Francis S. Husar
*Assistant Examiner*—David S. Safran
*Attorney, Agent, or Firm*—Bruce & McCoy

[57] ABSTRACT

A pellet mill for making food pellets from a flour product comprising a vertically arranged driven annular rotary die having radial die openings and a number of extrusion rollers inside this annular die and cooperating with the inner cylindrical wall of the die, which rollers are mounted for rotation in a common roller frame carried by a shaft which is held stationary by shear pins under normal operating conditions. The roller frame supports a number of feed tubes, one for each extrusion roller, which tubes each extend axially through the interior of the annular die between the rollers and near the inner die surface and the flour product is fed to these tubes by screw conveyors adjoining the open ends of the feed tubes with minimum clearance, the other, inner ends of the tubes being closed. Each feed tube has a side opening having the same axial length as the associated roller and having a circumferential width which gradually increases inwardly whereby the flour product discharged through the side opening of each feed tube is evenly distributed over the length of the roller and the effective width of the annular die.

12 Claims, 4 Drawing Figures

PELLET MILL WITH SEPARATE FEE MEANS FOR EACH DIE ROLLER

BACKGROUND OF THE INVENTION

The invention relates to a pellet mill for the production of extruded pellets, in particular animal food pellets from a flour product. The pellet mill may form part of an assembly comprising a feeding section to which the flour product is supplied, a conditioning section for blending the flour product with additives, such as molasses and/or for heating and moistening the mixture, and a press section or pellet mill for extruding the prepared flour product in the form of hard pellets of, f.i. cylindrical cross section. An assembly of this type is disclosed in U.S. Pat. No. 3,828,661.

Conventional pellet mills of the present type usually comprise a rotary annular die having a great number of radial die openings and enclosing an interior die space which is closed on one side and open on the opposite feed side. At its closed side the die is supported on one end of a horizontally mounted hollow drive shaft. A number of extrusion rollers, f.i. two such rollers are rotatably mounted in a common roller frame arranged in the interior of the die, the extrusion rollers cooperating with the inner cylindrical surface of the annular die in pressing the flour product fed to the die radially outwardly through the die openings. The roller frame is secured on one end of a second shaft extending through and rotatably mounted in the hollow drive shaft, shear pin means or the like connecting the opposite end of this second shaft to the frame of the mill for holding the second shaft and thus the roller frame stationary during normal operation of the mill. Feed means are arranged opposite the open side of the rotary annular die for feeding the flour product to be pressed to the interior of the die.

During the operation of a pellet mill of the above-described type the feed means should preferably feed the flour product to the die forwardly of the extrusion rollers (as seen in the direction of rotation of the die) allowing these rollers to press the material through the die openings whereby bar-shaped pellets are extruded which are cut to length by cutters engaging the cylindrical outer surface of the die. For a proper and efficient operation of the pellet mill it is obviously of importance that the material to be pressed is not only fed in equal portions to the several extrusion rollers but is also distributed evenly over the axial length of each roller and thus also over the effective width of the annular die in order to make full use of the capacity of the pellet mill and to avoid uneven wear of the rollers and of the die. However, for obtaining such an even distribution it is generally not allowable to use feed means which extend from outside the die into the die interior. The reason for this is that the extrusion rollers and the die must be protected against possible damage caused by overloading or by the occurence of foreign hard matter such as a piece of iron or stone, in the supplied flour product. If such a foreign hard body is clamped between a roller and the die and consequently the driven die exerts a rotational force on the roller frame, the shear pins normally holding the shaft of the roller frame stationary will break whereby the roller frame can rotate together with the die before the hard body can cause rupture of the die or other damage. Rotation of the central shaft supporting the roller frame causes the drive motor of the mill to be switched off. Since thus the roller frame must be free to rotate in cases of emergency, there should be no stationary parts, such as feed members, extending into the interior of the die. For this reason, in the conventional pellet mills of the present type the flour product is supplied to the open front side of the die from which the material must spread out across the die under centrigual action and sometimes with the help of suitable blades attached to the rotating die or by means of scraper elements mounted on the stationary central shaft. Generally, the material is fed at a single location at the lower side of the die independently of the number of the extrusion rollers and it will be clear that in this manner the above-mentioned even distribution of the supplied material over the several rollers and over the width of the die is rather illusory. A further consequence of this situation is that the die and the extrusion rollers can only have a limited axial dimension. Furthermore in these conventional feeding systems the distribution of the material in the die depends to a great extent on the properties of the flour product, such as the bulk density, the particle size and the fluidity thereof while also the rotational speed of the die has its influence.

SUMMARY OF THE INVENTION

The object of the invention is to provide a pellet mill which obviates the above-discussed draw backs of the conventional pellet mills and which provides an individual feed means for each of the extrusion rollers assuring an even distribution of the flour product over the axial length of these rollers.

According to the invention the pellet mill thus is provided with a feed assembly for feeding the flour product to the interior of the annular die which feed assembly has a plurality of seperate feed means one associated with each of the several extrusion rollers. Each feed means comprises a product conveying means, such as a screw conveyor, having a discharge end situated just outwardly of the die and a feed tube supported by the roller frame and extending axially through the interior of the die spaced from the inner cylindrical die surface and, as seen in the direction of rotation of the die, forwardly of the associated roller. Each feed tube is closed at its inwardly facing end and has an open inlet end situated with a minimum clearance directly opposite the conveying means discharge end. Each feed tube is further provided with a side opening having an axial length corresponding to the axial length of the associated roller and having a circumferential width which gradually increases inwardly whereby the flour product supplied to the feed tube by the conveying means and discharged through the side opening of the tube is evenly distributed over the axial length of the associated extrusion roller and over the effective width of the annular die.

The flour product to be pressed is thus not merely supplied to the open side of the die but is led by the feed tubes into the interior of the die. Since each extrusion roller has its own associated feed tube there is no problem in supplying the several rollers with equal quantities of flour product per unit of time. The side openings of the feed tubes then take care of an even distribution of the discharged material lengthwise of the rollers. Because the feed tubes are secured to the roller frame they will rotate together with this frame when the shear pins break as a result of extreme overloading or of the presence of a hard body between a roller and the die. The arrangement of the invention thus makes it possible to obtain a uniform feed independently of the properties of the flour product and of the rotational speed of the die whereby the mill can be loaded to its full capacity and no uneven wear will occur. At the same time, in designing the mill one is not restricted in the choise of the width of the die by feed problems so that dies of relatively great width can be used if the capacity of the mill is to be increased.

Preferably, each feed tube has a circular cross section, the side opening of the tube being bounded by two circumferentially extending lateral edges and two longitudinal edges, one situated higher than the other in which the higher longitudinal edge extends in the axial direction of the tube and the lower longitudinal edge follows a substantially helical edge course which as seen in the circumferential direction may extend through an angle of f.i. 70° – 90°. The feed tube may be so arranged that the vertical plane through the axis of the tube intersects the lower helical of the side opening. As a result of this shape of the lower edge of the side opening of each feed tube and the gradually inwardly increasing circumferential width of this opening following therefrom the material supplied to the feed tube will be gradually and progressively discharged through the side opening, part of this material only falling through this opening on reaching the closed inner end of the tube. In this manner, the desired even distribution of the material over the axial length of the associated extrusion roller can be obtained. Preferably each feed tube is mounted on the roller frame for angular adjustment about its axis whereby the position of the said lower helical edge of the side opening can be varied depending on the properties of the material to be processed.

BRIEF DESCRIPTION OF THE DRAWINGS

The drawings show a preferred embodiment of the pellet mill according to the invention.

PREFERRED EMBODIMENT OF THE INVENTION

Figure 1:
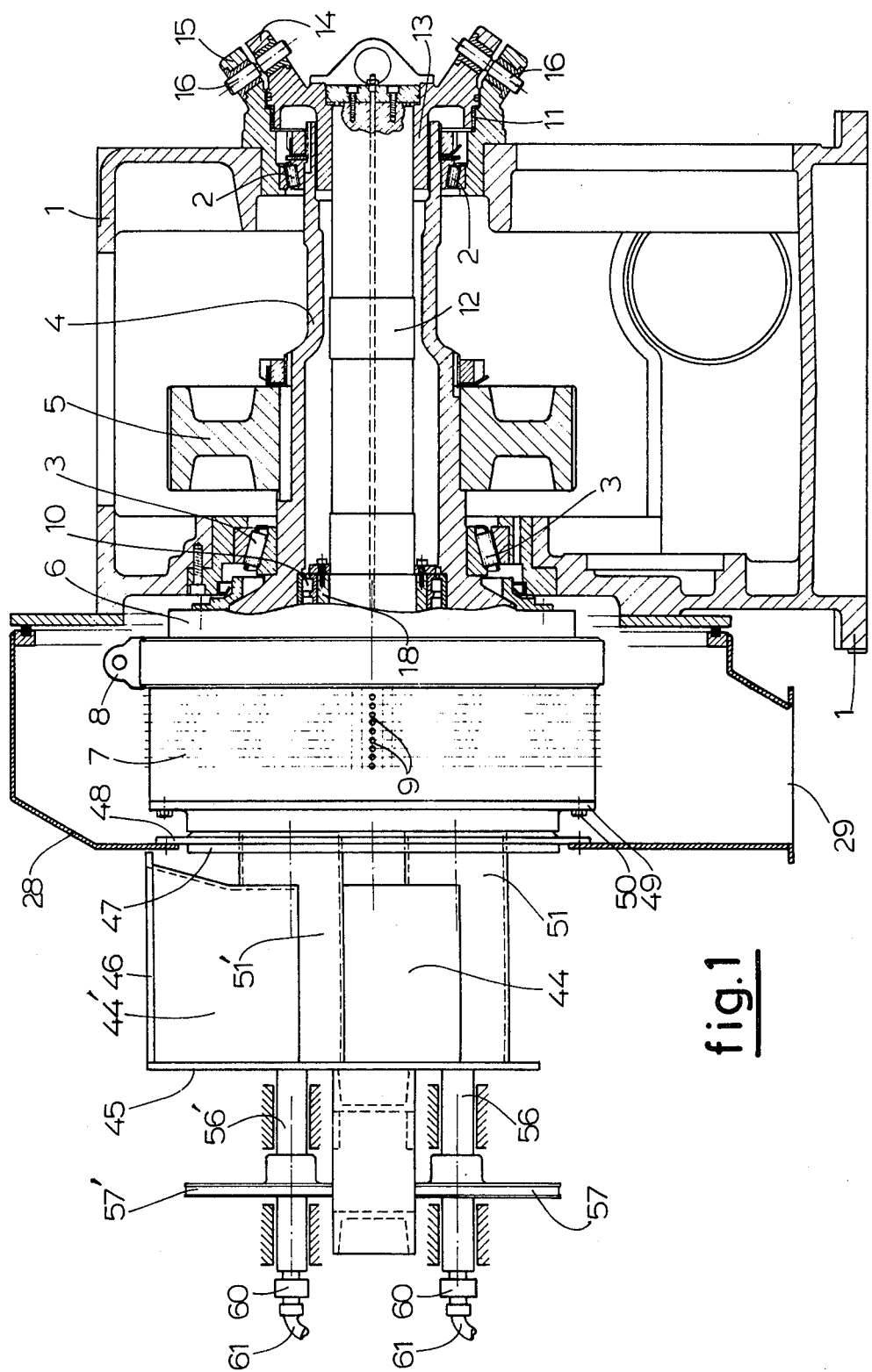
FIG. 1 is an elevation and partly a vertical axial section of the pellet mill.
Figure 2:
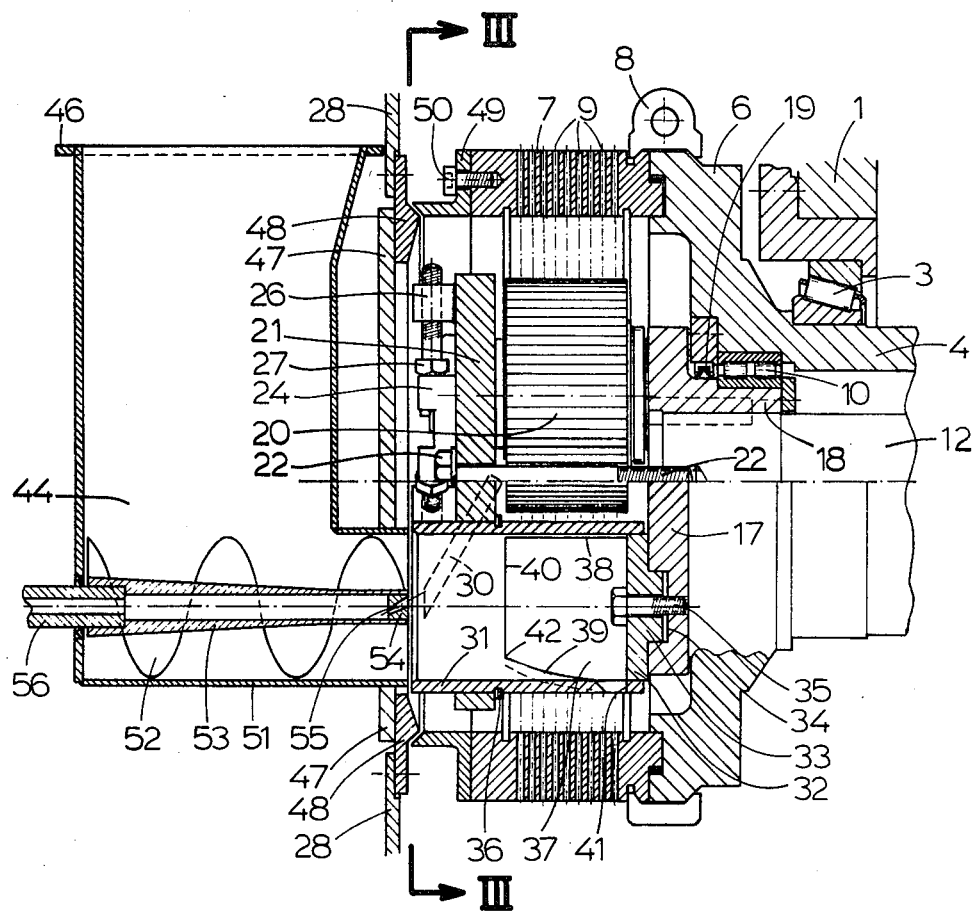
FIG. 2 is on an enlarged scale a section on the line II—II of FIG. 3 of the annular die, the extrusion rollers therein and the feed means of the pellet mill of FIG. 1.

Referring to the drawings and particularly to FIG. 1 thereof, the illustrated pellet mill is intended for pressing flour products and similar material, particularly animal food, to pellets. The pellet mill has a box-shaped frame 1 forming at the same time a gear case and rotatably supporting, by means of roller bearings 2 and 3, a hollow shaft 4. Secured on the hollow shaft 4 is a drive gear 5 which through suitable transmission means can be driven by an electric motor in a conventional manner not shown in the drawings. At its forward end the shaft 4 is provided with an integral flange 6 supporting an annular die 7 which die is releasably secured to the flange 6 by means of a split locking collar in a conventional manner (see also FIG. 2). The annular die 7 is circumferentially provided with a plurality of die openings 9 of circular cross section extending radially through the whole thickness of the die.

A central solid shaft 12 extends coaxially through the hollow drive shaft 4 and is rotatably mounted therein by means of roller bearings 10 and a bearing bush 11. A sleeve 13 is fixedly mounted on the rear end of the shaft 12 which sleeve has a conical flange 14 and supports the bearing bush 11. A conical flange member 15 is fixedly mounted at the rear side of the frame 1 which conical member 15 encloses the conical flange 14. Conical parts 14 and 15 have corresponding holes receiving two shear pins 16 preventing rotation of the central shaft 12 during the normal operation of the mill.

A sleeve 18 having a radial flange 17 is fixedly mounted on the forward end of the central shaft 12 and a seal ring 19 is arranged between the flange portion 6 of the hollow shaft 4 and this sleeve 18. The flange 17 supports two extrusion rollers 20 situated diametrically opposite one another inside the interior space of the annular die 7 for cooperation with the inner cylindrical surface of the die. At the other side the extrusion rollers 22 are supported by a substantially diamond-shaped front plate 21 which is connected to the central shaft 12 by means of a central bolt 22 passing through the front plate 21 and threadedly received in an axial screw hole in the end face of the shaft 12. The flange 17, front plate 21 and bolt 22 thus form a roller frame for the extrusion rollers 20 fixedly secured to the central shaft 12. The extrusion rollers 20 are each in a conventional manner mounted for free rotation on a roller shaft having an excentric stud portion formed at each end thereof which stud portions are adjustably received in corresponding bores in the flange 17 and the front plate 21, respectively. Only the forward stud portion 23 of this roller shaft structure is visible in FIG. 3. Adjusting means cooperate with the stud portion 23 of each roller shaft which means comprise a part 24 secured to the stud portion 23 and having two abutments 25 engaged by the bolt heads of two adjusting bolts 27 which are received in threaded sleeves 26 secured to the front plate 21. The bolts 27 thus maintain the part 24 in a fixed angular position. By adjustment of the adjusting bolts 27 the angular position of the stud portion 23 of the roller shaft can be changed for a readjustment of the extrusion rollers 20 with respect to the inner surface of the annular die 7 if this is necessary f.i. on account of wear of these rollers and/or of the die.

Figure 3:
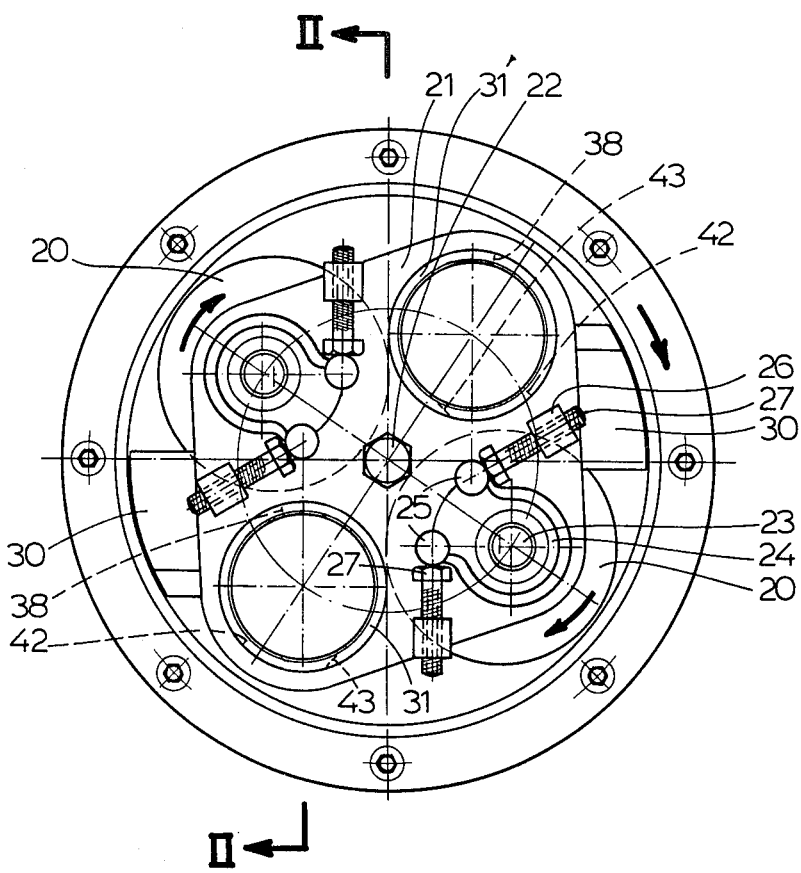
FIG. 3 is an end view taken on the line III—III of FIG. 2 of the annular die, the extrusion roller assembly and the feed tubes.

In the operation of the pellet mill the driven hollow shaft 4 rotates the annular die 7 in the direction of the arrow of FIG. 3 in which the roller frame carried by the central shaft 12 remains stationary and the two extrusion rollers 20 supported in this roller frame are set in motion by the rotating die rolling on the inner cylindrical surface thereof. The flour product to be processed is fed to the die 7 in a manner yet to be described and is pressed by the extrusion rollers 20 into the die openings 9 to be extruded at the outer circumference of the die as compressed bar-shaped bodies which are cut to length by cutting means (not shown) in a known manner. The die 7 is enclosed by a housing 28 (FIG. 1) releasably supported on the frame 1 and having a discharge opening 2 at its lower side, the cut-off pellets falling downwardly through this opening 29 onto suitable conveyor means or the like (not shown).

Two scraper means 30 supported by the front plate 21 engage the inner wall of the die 7 forwardly of the die openings 9 which scraper means, as seen in the direction of rotation of the die, are situated in front of the respective extrusion rollers 20.

The pellet mill as far as described in the foregoing is of conventional design and structure and for this reason a more detailed description of the afore-mentioned pars of the mill may be omitted. However, the feed assembly for supplying the flour product or other material to be processed to the die 7 has a novel design and will now be discussed.

As can be seen in FIG. 3 the two extrusion rollers 20 are arranged diagonally with respect to the vertical plane through the die axis in which, as seen in FIG. 3, the roller on the left side of this vertical plane has a higher position than the roller to the right side of this plane. Each extrusion roller 20 has its own product feed means associated therewith which, as seen in the direction of rotation of the annular die 7, is situated forwardly of the roller. Each of these two feed means comprises a feed tube 31 and 31', respectively, which feed tubes fittingly extend through openings in the front plate 21 into the interior of the die 7 and are secured to the flange 17 at their inner ends. The two feed tubes are each others mirror image so that a description of the feed tube 31, shown in cross section in FIG. 2, may suffice.

The feed tube 31 has a forward end projecting outside the front plate 21 and a rear end which is closed by an end disc 32 fixedly secured therein. The disc 32 has a central circular boss 33 fittingly received in a recess 34 in the flange 17. The disc 32 is secured to the flange 17 by an axial bolt 35 passing through a central hole in the disc 32 and the boss 33 and screwed into the flange 17 whereby on loosenings the bolt 35 the feed tube may be angularly adjusted about its axis and again be secured in any desired angular position. The feed tube 31 is provided with a retaining spring clip 36 mounted in a circumferential groove of the tube, the front plate 21 abutting this spring clip when the feed tube is properly mounted.

A side or discharge opening 37 is provided in the cylindrical side wall of the feed tube 31 which side opening is bounded by two longitudinal edges 38 en 39 and two circumferentially extending lateral edges 40 and 41. The axial length of the side opening 37 between the forward lateral edge 40 and the rear lateral edge 41, which coincides with the front face of the end disc 32, is equal to and covers the axial length of the extrusion rollers 20 and the width of the effective perforated portion of the die 7. The upper edge 38 of the side opening 37 extends axially close to the highest point of the feed tube 31. The lower edge 39 of the side opening 37 follows a helical line from its forward point of intersection 42 with the lateral edge 40 to its rear point of intersection 43 with the lateral edge 41 in such a manner that the circumferential width of the side opening 37 gradually increases inwardly from the lateral edge 40 to the lateral edge 41. In the normal position of the feed tube 31 the lower helical edge 39 intersects the vertical plane through the axis of the feed tube, the arrangement being such that the side openings 37 of the two feed tubes 31 and 31' form each others mirror image with respect to the vertical plane through the die axis and are turned outwardly towards the inner surface of the die 7 (see also FIG. 3). The total area of each side opening is at least approximately equal to the cross sectional area of each of the feed tubes 31 and 31'.

Figure 4:
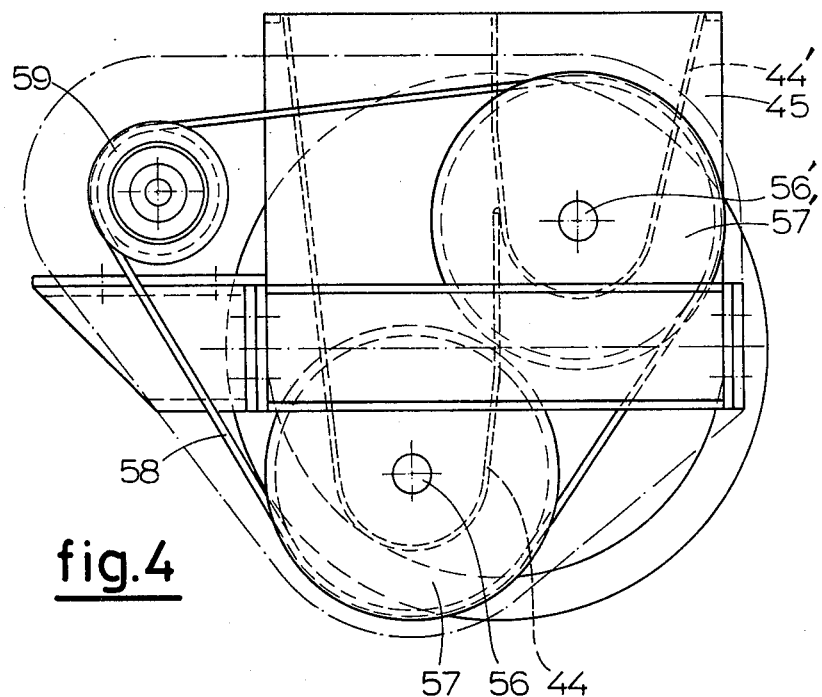
FIG. 4 shows schematically an end view of the feed assembly.

The feed assembly further comprises two hoppers 44 and 44' (FIG. 1 and 4), one for each feed tube which hoppers form a single structure and have a common front wall 45. The two hoppers 44 and 44' have immediately adjoining inlet openings at their upper ends which are surrounded by a common flange 46 for the connection of the hoppers to a common supply duct for the flour product. The hoppers 44 and 44' are removably mounted in a conventional manner not shown and are provided with a common circular connecting plate 47 which fits against a ring member 48 mounted in a circular opening in the front side of the housing 28. A ring member 49 of angular cross sectional shape is secured by bolds 50 against the end face of the die 7 which ring member 49 has a tapering forward edge situated with a minimum clearance opposite a corresponding tapering surface of the ring member 48 to prevent leakage of the supplied flour product to a minimum.

Each hopper 44, 44' terminates at its lower side into a screw housing or trough 51 having the same inner diameter as the feed tubes 31, 31' and extending through the plate 28 coaxially with the feed tubes 31 and 31', respectively. These inwardly directed open discharge ends of the screw housings 51 meet the outwardly facing open forward ends of the feed tubes 31 and 31' with a minimum clearance so that the feed tubes are free to move past the ends of the screw housings 51 on rotation of the flange 17 and central shaft 12. Each screw housing 51 contains a screw conveyor 52 having a hollow tubular shaft 53 which tapers in the direction of feed. The tubular shaft 53 is closed at its free end by a plug member 54 forming a nozzle with a bore 55 directed at an angle to the coinciding axes of the feed tube 31 and the conveyor screw 53. The tubular shaft 53 of the conveyor screw 52 is supported on the free end of a rotatably mounted hollow drive shaft 56 or 56', respectively, sealingly extending through the outer wall of the screw housing 51. Sheaves 57 and 57' on the drive shafts 56 and 56', respectively, are coupled by means of a rope 58 to a sheave 59 which is driven in a manner not shown by a suitable variable-speed driving motor or motor variator preferably through a slipping clutch for limiting the maximum torque. Swivel connections 60 mounted on the outer ends of the hollow shafts 56, 56' serve to connect flexible tubes 61 leading to a source of compressed air (not shown).

The flour product to be processed can be supplied in equal amounts to the two hoppers 44 and 44' from any suitable source, for instance from a flour conditioning apparatus which may be mounted on the pellet mill in a conventional manner. When the pellet mill is operating, the screw conveyors in the screw housings 51 and 51' feed the flour to the feed tubes 31 and 31'. As a result of the tapering shape of the hollow screw shafts 53 the flour is propelled in a uniform flow from the hoppers into the feed tubes, the flour leaving these tubes through the side openings 37 thereof. Because of the helical form of the lower edge 39 of the side opening 37 that part of the flour material which is not pushed over the higher first part of this edge 39 moves further inwardly, finally leaving the feed tube at the inner end thereof adjacent the end disc 32. By properly choosing the helical shape of the edge 39 it is possible to attain that the material is evenly discharged over the full length of the side opening 37 for uniform distribution across the axial length of the extrusion roller 20 and of the effective width of the die 7. For each type of flour optimum distribution can be obtained by proper angular adjustment of the feed tubes 31 and 31'. To that effect the bolt 35 and also the bolt 22 are loosened and, after adjustment of the feed tubes, again tightened.

The flour discharged through the side opening 37 of the feed tube 31 falls onto the inner cylindrical surface of the rotating annular die 7 and is carried by this moving surface to the associated extrusion roller 20 (on the left hand side of FIG. 3) situated above this feed tube 31 while the material discharged from the feed tube 31' falls onto the associated extrusion roller 20 (on the right side of FIG. 3) situated therebelow and is moved by this rotating roller towards the nip between this roller and the inner die face. The two extrusion rollers are thus fed individually and in equal measure and the material supplied to each roller is evenly distributed over the axial length thereof.

The feed tubes 31 and 31' can be provided with a suitable coating at their inner side to prevent adhesion of the flour thereto. If nevertheless some four material still adheres to the feed tubes, removal thereof is possible by periodically feeding compressed air to the hollow shafts 56 and 56', the hollow screw conveyor shafts 52 and the nozzles 54 at the end thereof whereby these rotating nozzles direct an air jet against the inner wall of the feed tubes. By adjustment of the speed of the conveyor screws 52 it is possible to regulate the rate of feed independently of the rotational speed of the annular die 7 and thus to adapt this rate of feed to the type of the flour material to be processed.

While the invention has been illustrated and described with reference to a specific embodiment thereof it will be understood that other embodiments may be resorted to within the scope of the following claims.

I claim:

1. A pellet mill for making pellets from flour products or similar material, comprising
   a frame,
   a first horizontally extending hollow drive shaft mounted for rotation in said frame and having two ends,
   an annular die member mounted coaxially on said first drive shaft at one of said ends thereof, said annular die having an inner cylindrical surface and a plurality of radial die openings extending through the annular body of said die, said annular die enclosing an interior die space open at the side of the die removed from said drive shaft,
   an extrusion roller assembly including a plurality of extrusion rollers arranged in spaced relationship in the interior of said annular die for cooperation with said cylindrical inner surface thereof, and a common roller frame supporting each of said rollers for free rotation,
   a second shaft extending through said first hollow drive shaft and having two ends, said roller frame being secured to one end of said second shaft, bearing means rotatably supporting said second shaft, shear pin means connecting said second shaft to said frame for holding said second shaft stationary during normal operating conditions of the mill, and
   a feed assembly for feeding the material to be pelleted to the interior of said annular die, said feed assembly including a plurality of separate feed means one associated with each of said extrusion rollers,
   each of said feed means comprising conveying means for said material having a discharge end situated opposite said open side of said annular die, and a feed tube supported by said roller frame and extending axially through the interior of said die spaced from said inner cylindrical die surface, said feed tube having an open inlet end situated with a minimum clearance directly opposite said discharge end of the associated conveying means, means closing said feed tube at its end opposite of said inlet end, said feed tube further having an opening in its side wall, said side opening having an axial length corresponding to and coinciding with the axial length of said associated extrusion roller and said side opening having a circumferential width gradually increasing inwardly towards said closed feed tube end whereby the material supplied to the feed tube by said conveying means and discharged through said side opening is substantially evenly distributed over the axial length of said associated extrusion roller and over the corresponding effective width of said annular die.

2. The pellet mill of claim 1 in which the area of said side opening of each of said feed tubes is at least approximately equal to the cross-sectional area of the feed tube.

3. The pellet mill of claim 1 in which each of said feed tubes have a circular cross-section and in which the side opening of each feed tube has two generally longitudinally extending edges, one of said edges situated higher than the other edge, the higher one of said two edges extending in the axial direction of the feed tube and the lower one of said two edges following a substantially helical course.

4. The pellet mill of claim 3 in which said helical lower edge of said side opening extends through an angle of approximately 70°–90° circumferentially of the feed tube.

5. The pellet mill of claim 3 in which said lower helical edge of said side opening intersects a vertical plane passing through the axis of the feed tube.

6. The pellet mill of claim 1 further comprising means for adjustably securing each of said feed tubes for angular adjustment about its axis.

7. The pellet mill of claim 6 in which said roller frame comprises a radial flange on said one end of said second shaft, a front plate spaced from said flange and a central bolt member securing said front plate to said one end of said second shaft, said extrusion rollers being supported between said flange and said front plate, said front plate having a plurality of openings therein, each of said feed tubes being fittingly received in one of said openings to extend through said front plate, said closing means of each of said feed tubes being secured to said flange.

8. The pellet mill of claim 7 further comprising bolt means releasably and adjustably securing said closing means of each of said feed tubes to said flange.

9. The pellet mill of claim 1 in which each of said feed means further comprises individual hopper means leading to said conveying means associated with the feed tube, said hoppers of said several feed means having inlet openings at their upper sides adapted for connection to a common supply means for said material.

10. The pellet mill according to claim 1 in which said conveying means each comprises a screw conveyor having a shaft tapering in the direction of feed.

11. The pellet mill of claim 1 in which said conveying means of each of said feed means comprises a screw conveyor having a hollow tubular shaft, a source of compressed air connectable to said hollow shaft and nozzle means arranged in the end of said hollow shaft opposite said feed tube for directing an air jet against the interior surface of said feed tube.

12. The pellet mill of claim 1 further comprising drive means for said conveying means and means for adjusting the speed of said drive means independently of the rotational speed of said annular die.

* * * * *